United States Patent
Yu et al.

(10) Patent No.: US 9,105,075 B1
(45) Date of Patent: Aug. 11, 2015

(54) ENHANCING SEISMIC FEATURES USING AN OPTICAL FILTER ARRAY

(71) Applicant: IHS Global Inc., Englewood, CO (US)

(72) Inventors: Yingwei Yu, Katy, TX (US); Clifford L. Kelley, Sugar Land, TX (US); Irina M. Mardanova, Houston, TX (US)

(73) Assignee: IHS GLOBAL INC., Englewood, CO (US)

( * ) Notice: Subject to any disclaimer, the term of this patent is extended or adjusted under 35 U.S.C. 154(b) by 130 days.

(21) Appl. No.: 13/760,903

(22) Filed: Feb. 6, 2013

(51) Int. Cl.
| | |
|---|---|
| G06T 5/00 | (2006.01) |
| G06K 9/00 | (2006.01) |
| G06K 9/74 | (2006.01) |
| G01V 1/28 | (2006.01) |
| G01V 1/30 | (2006.01) |
| G01V 1/34 | (2006.01) |
| G01V 1/36 | (2006.01) |

(52) U.S. Cl.
CPC ... *G06T 5/00* (2013.01); *G01V 1/28* (2013.01); *G01V 1/302* (2013.01); *G01V 2210/642* (2013.01)

(58) Field of Classification Search
CPC .......... G06K 9/00496; G06K 9/00503; G06K 9/741; G06T 2207/20048; G06T 2207/20056; G01V 1/28; G01V 1/307; G01V 1/345; G01V 1/364; G01V 1/368; G01V 2210/45
USPC ................ 382/109, 181, 191, 276, 279, 280; 367/14, 37, 38, 43, 49, 53, 64
See application file for complete search history.

(56) References Cited

U.S. PATENT DOCUMENTS

| | | | | |
|---|---|---|---|---|
| 4,800,539 | A | | 1/1989 | Corn et al. |
| 5,831,935 | A | * | 11/1998 | Luo et al. ........................ 367/47 |
| 5,930,730 | A | * | 7/1999 | Marfurt et al. ................. 702/16 |
| 6,018,498 | A | * | 1/2000 | Neff et al. ...................... 367/72 |
| 6,278,949 | B1 | | 8/2001 | Alam |
| 6,950,751 | B2 | | 9/2005 | Knobloch |
| 7,069,149 | B2 | | 6/2006 | Goff et al. |
| 7,308,139 | B2 | | 12/2007 | Wentland et al. |
| 7,519,206 | B2 | | 4/2009 | Mulet-Parada et al. |
| 7,627,429 | B2 | | 12/2009 | Li et al. |
| 7,729,862 | B2 | | 6/2010 | Dewarrat |
| 7,751,278 | B2 | * | 7/2010 | Barnes ........................... 367/40 |
| 8,055,026 | B2 | | 11/2011 | Pedersen |
| 8,265,876 | B1 | | 9/2012 | Yu et al. |

(Continued)

OTHER PUBLICATIONS

Admasu, Fitsum. A Stochastic Method for Automated Matching of Horizons across a Fault in 3D Seismic Data. Diss. Otto-von-Guericke-Univeritat, 2008. Print.*

(Continued)

*Primary Examiner* — Michael A Newman
(74) *Attorney, Agent, or Firm* — Faegre Baker Daniels LLP

(57) ABSTRACT

Seismic stratigraphic features may be enhanced using orientation vectors. In one example, a process includes converting a seismic attribute section from a spatial domain to a spatial-frequency domain using a Fourier transform. For each filter in an orientation filter array, the seismic attribute section is convolved with a filter in the spatial-frequency domain. The convolution result is converted back to the spatial domain by inverse Fourier transform. For each point in the seismic section an orientation filter having a response with a maximum energy is found and the orientation is associated with the corresponding energy and the corresponding point.

18 Claims, 8 Drawing Sheets

(56) References Cited

U.S. PATENT DOCUMENTS

| | | | |
|---|---|---|---|
| 2003/0055598 A1* | 3/2003 | Gillard et al. | 702/156 |
| 2006/0122780 A1* | 6/2006 | Cohen et al. | 702/14 |
| 2007/0147682 A1* | 6/2007 | Chang et al. | 382/190 |
| 2010/0270026 A1* | 10/2010 | Lazaratos et al. | 166/369 |
| 2013/0279293 A1* | 10/2013 | XU et al. | 367/73 |

OTHER PUBLICATIONS

Zhang, et al. "Binary Gabor pattern: An efficient and robust descriptor for texture classification ." Image Processing (ICIP), 2012 19th IEEE International Conference on . (2012): 81-84. Print.*

Becke, et al. "Seismic Attribute and Structural Interpretation—It Takes Two to Tango . . . " APPEA Journal. (2012): 437-454. Print.*

Yingwei Yu et al., "Automatic Horizon Picking in 3D Seismic Data Using Optical Filters and Minimum Spanning Tree", Seismic Micro-Technology, Inc. © 2011, Society of Exploration Geophysicists, 5 pages.

Fitsum Admasu et al., "An Approach Towards Automated Fault Interpretations in Seismic Data", Otto-von-Guericke Universitat Magdeburg, Fakultat fur Informatik, Institut fur Simulation and Graphik, D-39016 Magdeburg, Germany, 13 pages, (2005).

Yu et al. "Angular Disinhibition Effect in a Modified Poggendorff Illusion". 6 Pages. In Kenneth D. Forbus, Dedre Gentner, and Terry Regier, Editors. Proceedings of the 26th Annual Conference of the Cognitive Science Society. 2004.

Yu et al. "Neural Model of Disinhibitory Interactions in the Modified Poggendorff Illusion". Biological Cybernetics. vol. 98(1). pp. 75-85. 2008.

* cited by examiner

ENHANCING SEISMIC FEATURES USING AN OPTICAL FILTER ARRAY

FIELD

The present description relates to enhancing attributes of seismic traces from and, in particular, to enhancing attributes using filters and orientation vectors.

BACKGROUND

The oil and gas industries regularly employ seismic reflection surveys to image the earth's subsurface, looking for geologic structures and environments capable of generating, migrating, and trapping commercial hydrocarbon deposits. Geoscientists use a variety of different seismic sections including two dimensional (2D) seismic slices and three dimensional (3D) seismic volumes to more fully define geologic structural and stratigraphic features commonly associated with hydrocarbon discoveries, such as subsurface faults, unconformities, channels, and submarine fans. The slices and volumes are built from reflection survey data collected from a slice or volume of the subsurface. Today, 3D seismic is increasingly being employed to detect and map natural fracture systems that can greatly influence the effective permeability of producing reservoirs, thereby affecting the overall economics of developing oil & gas fields.

Seismic reflection surveys are performed using sensors placed on land, in the sea, and on the sea floor. Received reflections are noise-filtered and the data are otherwise conditioned for interpretation. A typical record of seismic echoes as detected by a single receiver at the surface is a trace in the shape of a sinusoidal curve as a function of time. Seismic echoes oscillate between compression and rarefaction over a period of several seconds, and this rise and fall in pressure with time is recorded for processing and analysis. The amplitude generally reflects the nature of the formation, while the time generally reflects the depth below the receiver. A seismic trace may be subject to multipath, interference, echoes and other effects that reduce the accuracy of the trace. As a result the traces are filtered, conditioned, and interpreted. An interpreter may have several thousand or several million traces to interpret in a single survey.

One element of interpreting subsurface rock and fluid characteristics as well as the presence of faults and channels is the analysis of properties of the recorded seismic waveforms known as seismic attributes. Various attributes may be determined in a variety of different ways from elements of the seismic waves themselves, such as amplitude, phase, frequency, and attenuation. There are also attributes associated with the differences in adjacent recorded waveforms such as similarity or semblance, discontinuity, and attenuation. These latter attributes are more typically used to identify changes from one recorded signal to another. As a result they reveal subtle structural and stratigraphic features within a 2D slice or 3D seismic volume such as faults, fractures, channels, and salt domes.

BRIEF DESCRIPTION OF THE DRAWING FIGURES

Embodiments of the invention are illustrated by way of example, and not by way of limitation, in the figures of the accompanying drawings in which like reference numerals refer to similar elements.

DETAILED DESCRIPTION

Figure 1:
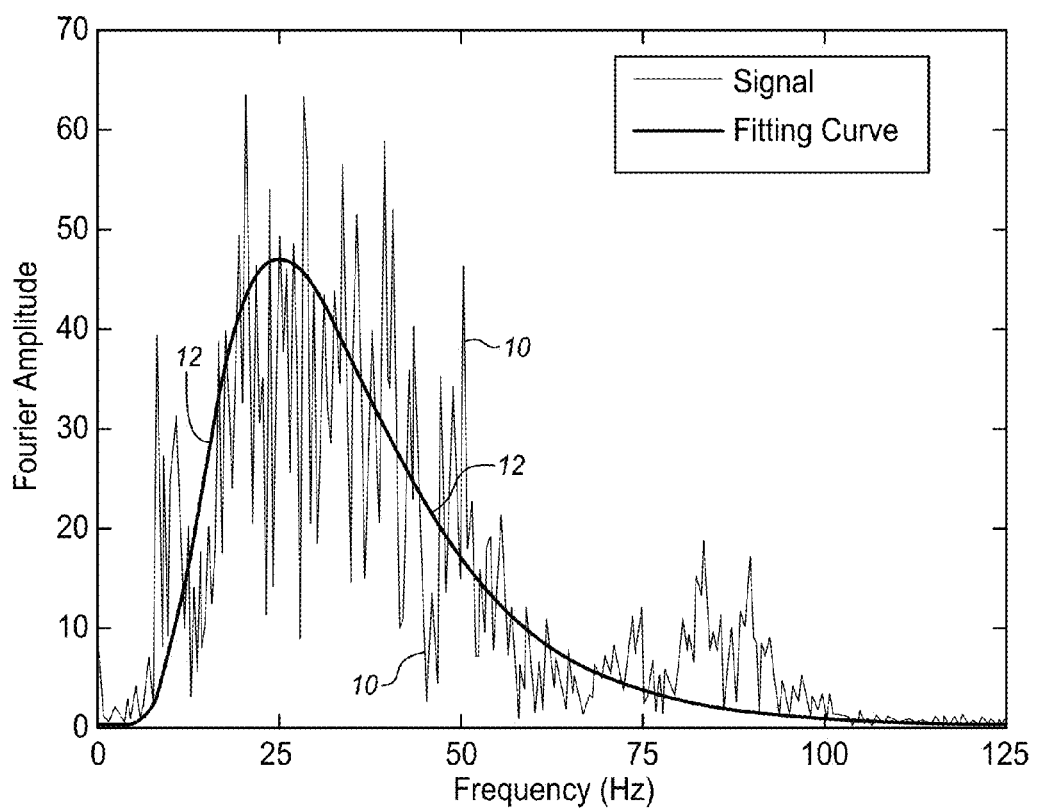
FIG. 1 is a diagram of a graph of a power spectrum of seismic data as represented by a Fourier transform of seismic traces.

As described herein, fault attributes can be enhanced in both two and three dimensional seismic samples. Enhancing the fault attributes improves automatic and manual fault extraction workflows, regardless of the fault attributes that are being enhanced. In some embodiments, the resulting attributes present smoother and cleaner curve lines or plane patterns with sharper contrast.

As described herein, a fault may be enhanced by analyzing a fault curve's orientations in two dimensions, or by detecting the dip and azimuth of a planar structure pattern in three dimensions, then enhancing an attribute along the detected directions. The orientation information of the fault structures may also be estimated as dip and azimuth attributes.

The processes described herein present orientation detectors. In one embodiment, optical filters, such as log-Gabor filters or modified log-Gabor filters are used with specific orientation and scale configurations. An array of such orientation detectors provides an orientation-enhanced version of a fault attribute.

A variety of different attributes of seismic traces may be used to reveal and display fault patterns in a formation. However, actual fault patterns in a formation may not be continuous, and a single fault may appear as a combination of seemingly isolated parts. In addition, horizontal footprints may coexist in the fault attributes in great numbers further obscuring the faults. This makes it difficult for faults to be picked out automatically. Faults may be picked out more easily if isolated parts of a single fault can be connected together into a single piece. Faults may also be picked out more easily if footprints of low dips can be removed. These types of operations are referred to herein as fault enhancement.

The fault enhancement techniques described herein may be applied to either a 2D (two-dimensional) attribute image, or a 3D (three dimensional) attribute volume. For a 2D seismic attribute image, the fault pattern may be enhanced through smoothing along curve directions, while suppressing unwanted patterns in other directions, such as horizontal footprints.

In general, the orientation patterns in a seismic image, such as the dip and azimuth attributes, may be used as tools for 2D and 3D seismic data interpretation. Such attributes may be used to highlight faults and fractures or to provide guidance for horizon auto-picking. In one embodiment, an array of log-Gabor filters is employed to highlight orientation differences, and an orientation vector field is generated to represent the orientation patterns in the seismic attribute.

A 2D form Gabor wavelet may be used as an orientation detector in imaging processing. The log-Gabor filter is a modification that has no DC (Direct Current) component and overcomes a bandwidth limitation in the conventional Gabor filter. The log-Gabor filter also has a logarithmic Gaussian profile which corresponds more closely to the frequency characteristics of many seismic data trace slices and volumes.

A 2-D log-Gabor filter may be defined in the frequency domain as follows:

$$H(f,\alpha) = H_f \times H_\alpha \qquad \text{(Eq. 1)}$$

where $H_f$ is a radial component and $H_\alpha$ is an angular component. The radial component is 2D Gaussian in logarithmic scale, and the angular component is Gaussian along orientations. More specifically, $$H(f,\alpha) = \exp\left(-\frac{\ln^2(f/f_0)}{2\ln^2(\sigma_f/f_0)}\right) \times \exp\left(-\frac{(\sigma-\theta)^2}{2\sigma_a^2}\right) \qquad \text{(Eq. 2)}$$

where $f_0$ is a central frequency, and $\theta$ is the filter direction.

FIG. 1 is a diagram of a graph of a power spectrum of seismic data as represented by a Fourier transform of seismic traces. The traces are transformed into the frequency domain using a DFFT (Discrete Fast Fourier Transform). These individual signals 10 are charted as Fourier amplitudes or the strength of the frequency responses on the vertical axis against frequency on the horizontal axis. A logarithmic Gaussian curve 12 is overlaid on the sample data 10 to show how well the data corresponds to a Gaussian distribution curve.

Figure 2A:
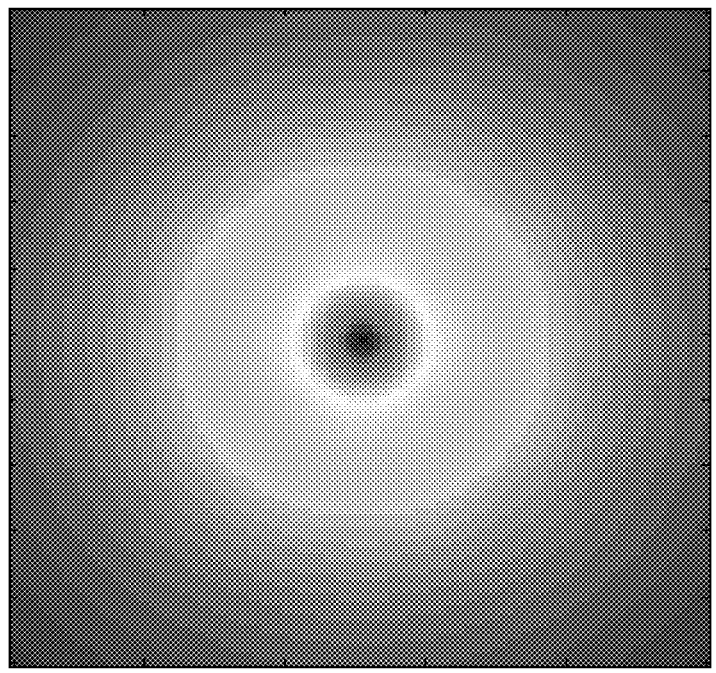
FIG. 2A is a logarithmic scale diagram of a radial component of a Log-Gabor filter in a frequency domain, wherein the amplitude is shown by equal magnitude concentric circles.
Figure 2B:
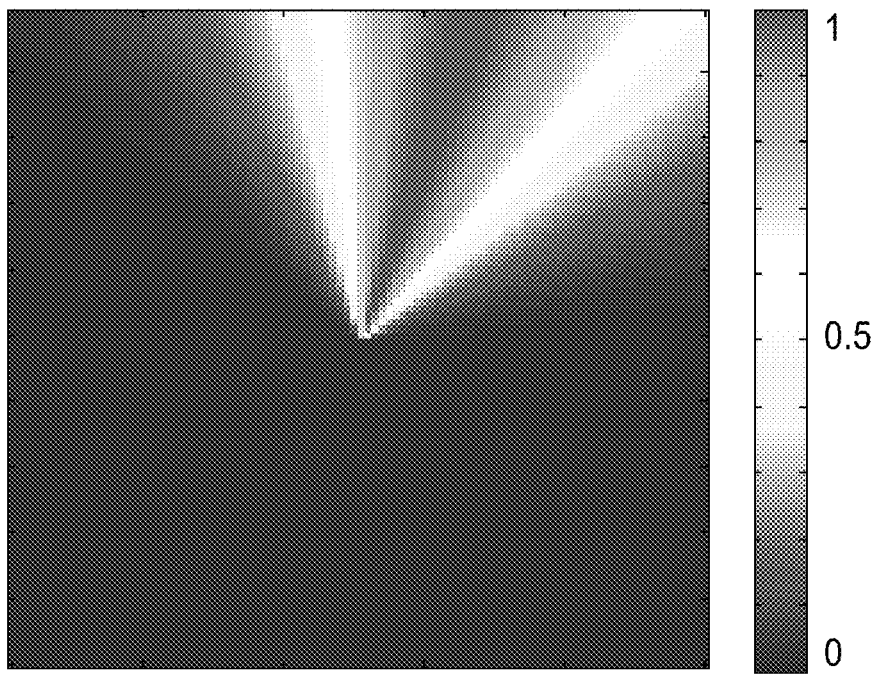
FIG. 2B is a logarithmic scale diagram of an angular component of a Log-Gabor filter in a frequency domain, wherein the amplitude is shown along orientations.

FIG. 2A is a diagram of a Log-Gabor filter in a frequency domain. In particular FIG. 2A shows the radial component as 2D Gaussian in a logarithmic scale. The amplitude is shown by equal magnitude concentric circles so that the higher concentration of circles in the middle shows the Gaussian distribution. FIG. 2B shows the angular component as Gaussian along orientations. In this case, radial lines indicate the orientation values as clustered at about 15 degrees from vertical. The number of lines falls off with distance from 15 degrees in a Gaussian distribution. FIGS. 1, 2A, and 2B are based on real seismic data and show that natural formations tend to show these Gaussian distributions.

A simpler filter array may be constructed using a modified Log-Gabor filter. Considering the radial component $H_f$ in equation 3.1, $H_{\sigma_f,f_0}$ may be used to represent the radial component with a central frequency $f_0$ and a standard deviation $\sigma_f$ as follows:

$$H_{\sigma_f,f_0}(x) = \exp\left(-\frac{\ln^2(x/f_0)}{2\ln^2(\sigma_f/f_0)}\right) \qquad \text{(Eq. 3)}$$

For a large number of such radial components with even intervals in the central frequency and assuming a Gaussian data distribution, the radial component can be approximated as a step function, normalized as being either 0 or 1. This step function can be developed from a numeric simulation of filter summation. When Log-Gaussian shaped filters are added in multi-scales, the sum of their impulse responses approximates a step function.

As a result, a step function may replace the log-Gaussian shaped radial component in Equation 3.1, above. A step function greatly reduces the computational complexity in comparison to a logarithmic function. As a result many more points in a seismic attribute section can be analyzed in the same amount of time. This modified log-Gabor filter may be defined in the frequency domain as follows:

$$H(f,\alpha) = S(f) \cdot \exp\left(-\frac{(\sigma-\theta)^2}{2\sigma_a^2}\right). \qquad \text{(Eq. 4)}$$

where $S(f)=1$ when $f>0$, and $S(f)=0$ when $f=0$.

This definition for the radial component removes the need for multiple scales when detecting the salient orientation, while keeping out the DC component in the same way as the Log-Gabor filter. The strongest orientation $\gamma$ for pixel (x,y) can now be rewritten as:

$$\gamma(x,y) = \text{argmax}_\theta Y^{<\theta>}(x,y) \qquad \text{(Eq. 5)}$$

where $Y^{<\theta>}$ is the frequency response at a point (x,y) in a seismic image, referred to generally here as a seismic attribute section. The modified Log-Gabor filter array, does not depend on the central frequency, and as a result, the number of filters used to derive the orientation field is highly reduced.

Having now determined two different possible approaches to determining the orientation $\gamma$, the input seismic data can be interpreted by detecting the orientations of a large field of seismic traces. A typical single orientation detector can respond maximally to one particular predetermined angle, but cannot tell the exact angle in the input. For a sufficiently large set of orientations, any one orientation detector will have responses that can be approximated by Gaussian distributions.

Using an array of multiple resolution log-Gabor or modified log-Gabor filters centered on a number of different orientations, the orientations of the input seismic data can be analyzed. An Orientation Vector Field (OVF) can be derived as follows.

For an input image in the spatial domain I(x,y), a Fourier transform is applied to convert the input image into the frequency domain $\hat{I}(u,v)$. The log-Gabor filter may be applied in frequency domain as follows:

$$\hat{Y}^{<w,\theta>}(u,v) = H^{<w,\theta>}(u,v)\hat{I}(u,v) \qquad \text{(Eq. 6)}$$

where H is the log-Gabor filter with orientation $\theta$ and central frequency w. Since it is an array of log-Gabor filters, the central orientations $\theta$ can be in a series of orientations, such as $\{-\pi/2, -5\pi/8, -\pi/4, \ldots +\pi/4, +5\pi/8\}$ and w can be in single or multiple scales as well.

By inverse Fourier transform, $\hat{Y}^{<w,\theta>}(u,v)$ can be converted into a complex image in the spatial domain. The resulting convolved image has a real part, $Y_r^{<w,\theta>}(u,v)$, and an imaginary part, $Y_{im}^{<w,\theta>}(u,v)$. The norm of the complex image is called orientation energy in the specific orientation $\theta$ and scale w:

$$Y^{<w,\theta>}(x,y) = \sqrt{[Y_r^{<w,\theta>}(x,y)]^2 + [Y_{im}^{<w,\theta>}(x,y)]^2} \text{ etc.} \qquad \text{(Eq. 7)}$$

When all the filter responses for an individual pixel at (x,y) are lined up, a perceived orientation at this point may be determined by getting the location of peak responses in the orientation column. The most salient orientation pattern $\gamma$ at pixel (x,y) may be defined by the index of the peak value of the summed orientation responses in all scales:

$$\gamma(x,y) = \text{argmax}_\theta \Sigma_w Y_r^{<w,\theta>}(x,y). \quad \text{(Eq. 8)}$$

The OVF (Orientation Vector Field) may be defined using vectors with two components: orientation; and orientation energy. The orientation may be provided as $\gamma(x,y)$ as described above. The orientation energy $E(x,y)$, may be defined as the sum of filter responses with the orientation $\gamma(x,y)$ in all scales:

$$E(x,y) = \Sigma_w Y_r^{<w,\gamma(x,y)>}(x,y) \quad \text{(Eq. 9)}$$

The orientation energy E reflects the strength of each orientation feature. Low values of orientation energy mean that there are fewer oriented patterns in the neighborhood, while stronger orientation values mean that the orientation feature is more salient in the context. The attribute enhancement techniques described above can be summarized in Example 1 for a single central frequency and Example 3 for multiple frequencies.

Figure 3:
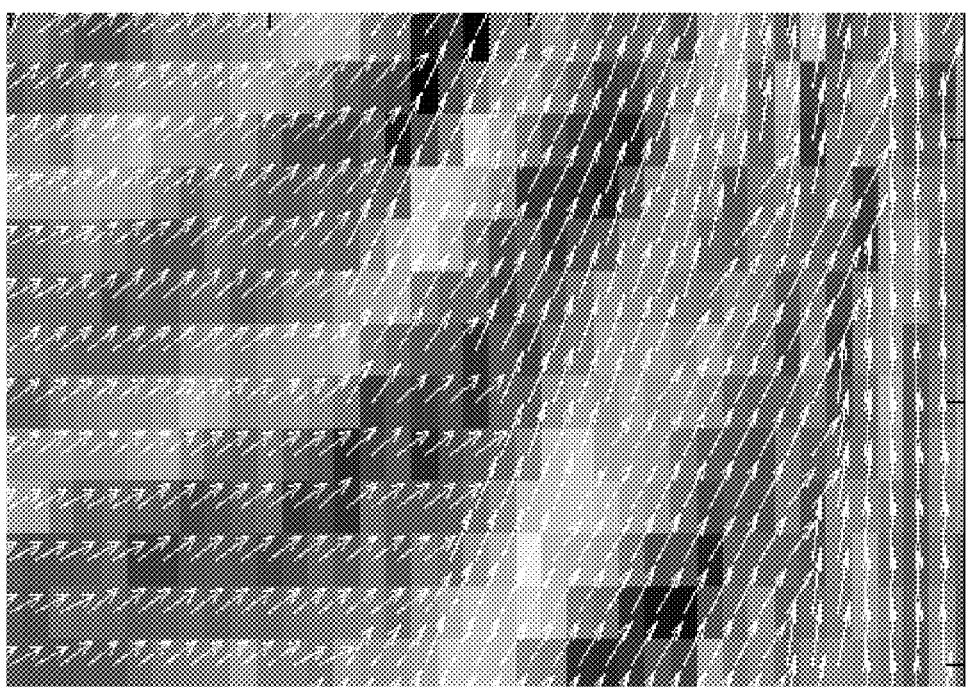
FIG. 3 is a diagram of an orientation vector field for a 2D seismic slice, wherein orientation is shown as arrows with a normalized magnitude according to an embodiment of the invention.

Results of such techniques are shown as an example in FIG. 3 which is a diagram of an example OVF generated for a 2D seismic slice. The orientation vectors are plotted as arrows showing orientation on top of a seismic image. The magnitudes of the vectors are normalized. Accordingly only the orientation is shown and not the orientation energy.

Example 1 is a pseudo code example of enhancing an attribute such as coherence, symmetry or any other attribute using an array of single frequency log-Gabor filters in the spatial frequency domain. In Example 1, I is a 2D seismic image. The applied log Gabor filter array has a central frequency $f_0$, with a frequency standard deviation $\sigma_f$, an angle standard deviation $\sigma_\alpha$, an array of angles A, and an array of frequencies W. The process shown in Example 1 may be described as first obtaining seismic attribute section, in this case, a 2-D seismic attribute slice I. Second, converting the slice I into the spatial-frequency domain $\hat{I}$ using a 2D Fourier transform. Third, for each orientation $\theta$ in the array of angles A, convolving the transformed slice image $\hat{I}$ within the spatial-frequency domain with the 2D log Gabor filter array. The results are converted back to the spatial domain by inverse Fourier transform and the absolute value for each angle is taken.

Fourth, the energy of the converted result for all of the orientations is summed. In this example, the result is named $Y[\theta]$. Fifth, for each every point in the section, in this case pixel (x,y) in the image slice the maximum orientation value and the energy for that orientation is obtained.

This process is shown as pseudo-code in Example 1. The attribute that is being enhanced within the seismic image may be coherence, symmetry, or any other attribute. The array W of frequencies w and the array A of angles $\theta$ may have one or many frequencies and angles.

Figure 4:
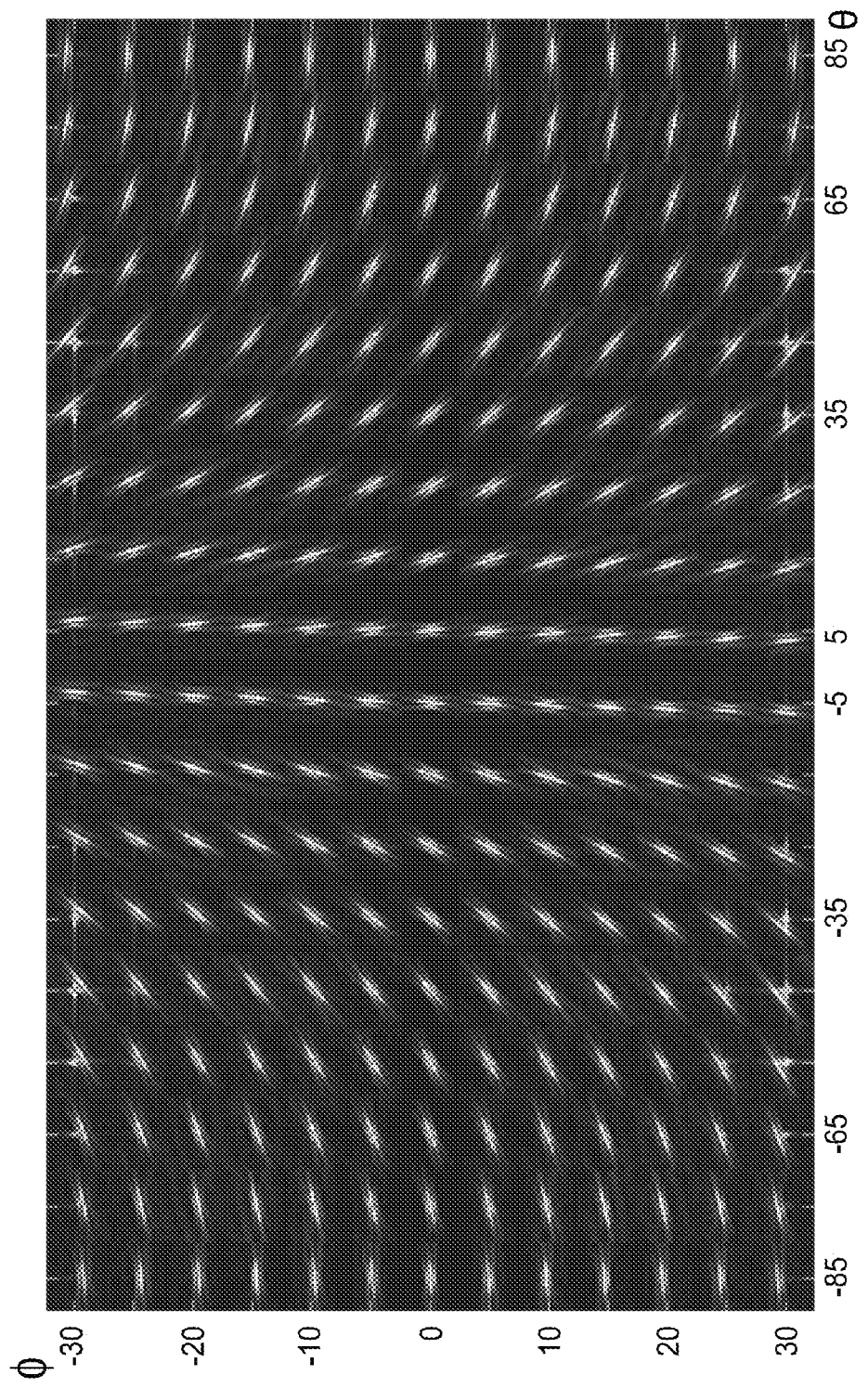
FIG. 4 is a diagram of an array of 3D Log-Gabor filters for a volume of horizontal slices according to an embodiment of the invention.
Figure 5:
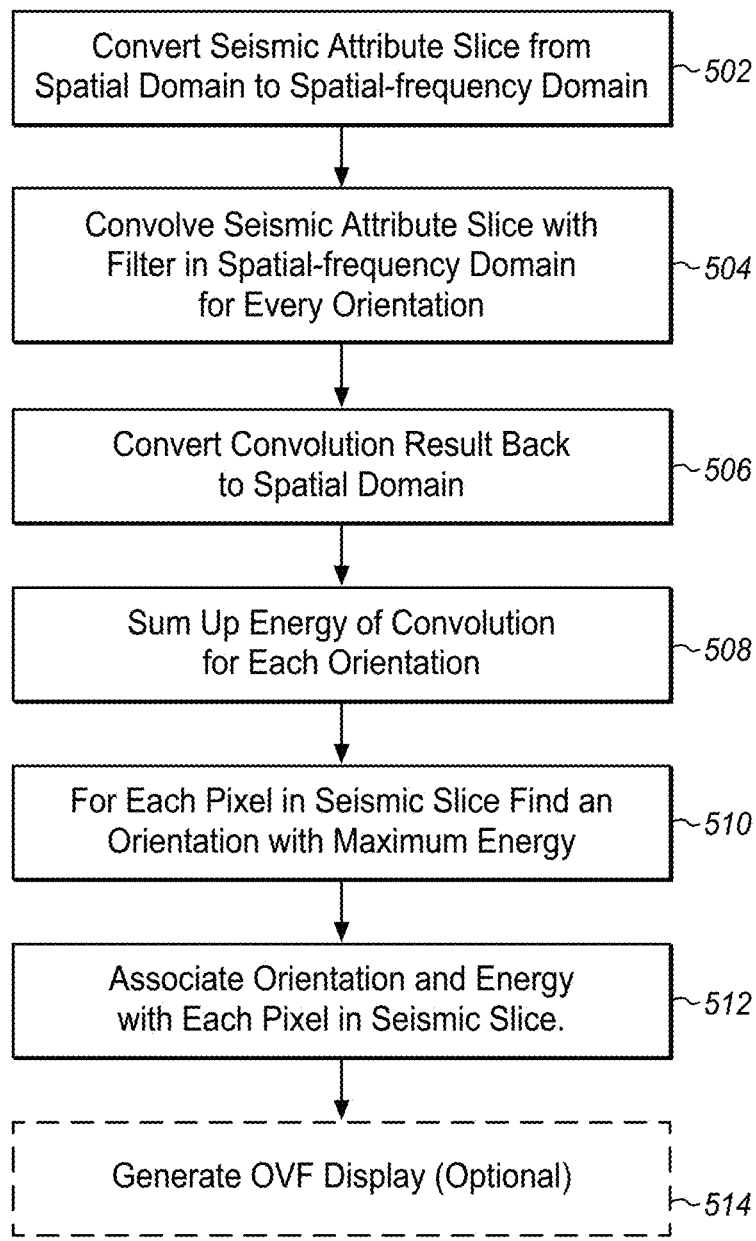
FIG. 5 is a process flow diagram of generating an orientation for a seismic attribute slice according to an embodiment of the invention.

The process of Example 1 is shown generally in the process flow diagram of FIG. 5. At 502, a seismic attribute slice is converted from a spatial domain to a spatial-frequency domain using a Fourier transform. At 504, for every orientation in an orientation array, the seismic attribute slice is convolved with a filter in the spatial-frequency domain. At 506, the convolution result is converted back to the spatial domain by an inverse Fourier transform. At 508, the energy of the convolution result for each orientation is summed up. At 510, an orientation with a maximum energy is found for each pixel in the seismic slice, and at 512, orientation and energy are associated with each pixel in the seismic slice. Optionally, the orientation energy for each pixel may be used to generated an OVF image such as that of FIGS. 3 and 4.

Example 1

Attribute Enhancement (Single Frequency)

```
1:  procedure ENHANCESF(I,f₀,σ_f,σ_α,A)     I: seismic image in 2D, f₀:
       log-Gabor central frequency, σ_f: log-Gabor frequency standard
       deviation, σ_α:log-Gabor angle standard deviation, A: an array of angles.
2:     Î ← FFT 2(I)                          Apply 2D Fourier transform
3:     for each orientation θ in A do
4:        Ĥ[θ] ← logGabor2(f₀,σ_f,σ_α,θ)    2D log-Gabor filter (Eq. 1)
5:        [θ] ← Ĥ[θ] · Î                    Convolution (Eq. 6)
6:        R[θ] ← IFFT 2(  [θ])              Apply inverse Fourier transform
7:        Y [θ] ← ‖R[θ]‖                    Get absolute value (Eq. 7)
8:     end for
9:     for each pixel (x,y) in I do
10:       γ(x,y) ← argmax_θ Y [θ](x,y)      Orientation (Eq. 8)
11:       E(x,y) ← Y [γ(x,y)](x,y)          Orientation energy (Eq. 9)
12:    end for
13:    return γ,E
14: end procedure
```

Example 2 is a pseudo code example of enhancing an attribute such as coherence, symmetry or any other attribute using a multiple frequency log-Gabor filter array instead of the single frequency log-Gabor filter array of Example 1. The process may be summarized as shown below. The process becomes more complex as the process is repeated for each of the multiple frequencies. Multiple frequencies means that there are at least two. There may be as few as 2 and as many as desired based on available computation resources and desired detail.

The process shown in Example 2 may be described as first obtaining a 2-D seismic attribute slice I. Second, converting the slice I into the spatial-frequency domain $\hat{I}$ using a 2D Fourier transform. Third, for each orientation $\theta$ in the array of angles A and for each frequency w in the array of frequencies W, convolving the transformed slice image $\hat{I}$ within the spatial-frequency domain with the 2D log Gabor filter, and convert the result back to the spatial domain by inverse Fourier transform.

Fourth, get the energy values using the absolute value of the results of the inverse Fourier transform and sum up the energy of the converted result for all of the frequencies for each orientation. Fifth, for each pixel (x,y) in the image slice get the maximum orientation value and obtain the energy for that orientation.

Considering Example 2 more precisely, the operations can be stated in terms of a method of enhancing the fault structures from a 2-D seismic attribute slice I, to generate a new Fault Enhancement attribute for this slice I. The operations include:

(a) Obtaining a 2-D seismic attribute slice I.

(b) Given an array of orientations A and an array of frequencies W as parameters for the filter bank, (c) Converting the seismic slice I into the spatial-frequency domain $\hat{I}$ using a 2D Fourier transform.

(d) For every orientation $\theta$ in array A and every frequency w in W, these operations are performed:

i. Defining a corresponding 2D log-Gabor filter $\hat{H}[\theta,w]$ in the spatial-frequency domain;

ii. Convolving $\hat{I}$ in the spatial-frequency domain with the filter, and saving the result into [θ,w]; and iii. Converting [θ,w] back to spatial domain R[θ,w] by inverse Fourier transform.

(e) For each orientation θ in array A, summing up the energy of R[θ,w] for all frequencies w in W and saving the result to Y[θ].

(f) For every pixel (x,y) in I, these operations are performed:

i. Getting an orientation γ such that Y[θ](x,y) has the maximum value of any other Y[θ](x,y) when θ=γ (the value γ is the orientation that associates with the input pixel at (x,y));

ii. Saving the value of Y[γ](x,y) to E(x,y), which is the orientation energy associated with the input pixel (x,y).

Example 2

Attribute Enhancement (Multiple Frequencies)

```
1:  procedure ENHANCE2DMF(I,W,σ_f,σ_α,A)    I: seismic image
    in 2D, W: an array of log-Gabor central frequencies, σ_f: log-Gabor
    frequency standard deviation, σ_α: log-Gabor angle standard
    deviation, A: an array of angles.
2:      Î ← FFT 2(I)                        Apply 2D Fourier transform
3:      for each orientation θ in A do
4:          for each frequency w in W do
5:              Ĥ[w,θ] ← logGabor2(w,σ_f,σ_α,θ)   2D log-Gabor filter (Eq. 1)
6:          end for
7:          [w,θ] ← Ĥ[w,θ]Î                 Convolution (Eq. 3.5)
8:          R[w,θ] ← IFFT 2(R̂ [w,θ])         Apply inverse Fourier
                                             transform
9:          Y [θ] ← Σ_w ‖R[θ]‖              Get energy value (Eq. 7)
10:     end for
11:     for each pixel (x,y) in I do
12:         γ(x,y) ← argmax_θ Y [θ](x,y)    Orientation (Eq. 8)
13:         : E(x,y) ← Y [γ(x,y)](x,y)      Orientation energy (Eq. 9)
14:     end for
15:     return γ,E
16: end procedure
```

Example 3 is a pseudo code example of enhancing an attribute such as coherence, symmetry or any other attribute using a multiple frequency modified log-Gabor filter instead of the single or multiple frequency log-Gabor filter of Examples 1 and 2. As in Examples 1 and 2, Example 3 begins by obtaining a 2-D seismic attribute slice I. First the slice is converted into the spatial-frequency domain Î by a 2D Fourier transform. Second, for each orientation in array A, a corresponding modified 2D log-Gabor filter Ĥ[θ] is convolved with the slice in the spatial-frequency domain. Then the result is converted back to spatial domain by an inverse Fourier transform and saved as Y[θ].

Third for each every pixel in the slice, the maximum orientation value is determined and the corresponding energy value. As with Example 1 and 2, the orientations and corresponding energies at each pixel may be used to develop an OVF field as shown in FIG. 3.

Considering Example 3 more precisely, the operations can be stated in terms of a method of enhancing the fault structures from a 2-D seismic attribute slice I, to generate a new Fault Enhancement attribute for this slice S. The operations include:

(a) Obtaining a 2-D seismic attribute slice I.

(b) Given an array of orientations A as parameters for the filter bank.

(c) Converting the I into the spatial-frequency domain Î by 2D Fourier transform.

(d) For every orientation θ in array A, these operations are performed:

i. Defining a corresponding modified 2D log-Gabor filter Ĥ[θ] in the spatial-frequency domain;

ii. Convolving Î with the filter in the spatial-frequency domain, and saving the result into [θ]; and iii. Converting [θ] back to the spatial domain Y[θ] by inverse Fourier transform.

(e) For every pixel (x,y) in I, do the following:

i. Get orientation γ such that Y[θ](x,y) has the maximum value than any other Y[θ](x,y) when θ=γ. The value γ is the orientation that associates with the input pixel at (x,y).

ii. Save the value of Y[γ](x,y) to E(x,y), which is the orientation energy associated with the input pixel (x,y).

Example 3

Attribute Enhancement 2D (Modified Log-Gabor Filter)

```
1:  procedure ENHANCE2DMODIFIED(I,σ_α,A)    I: seismic
    image in 2D, σ_α:log-Gabor angle standard deviation, A: an
    array of angles.
2:      Î ← FFT 2(I)                        Apply 2D Fourier transform
3:      for each orientation θ in A do
4:          Ĥ[θ] ← modifiedLog-             Modified 2D log-Gabor filter
            Gabor2(σ_α,θ)                   (Eq. 3.3)
5:          [θ] ← Ĥ[θ]Î                     Convolution (Eq. 6)
6:          R[θ] ← IFFT 2( [θ])             Apply inverse Fourier transform
7:          Y [θ] ← ‖R[θ]‖                  Get absolute value (Eq. 7)
8:      end for
9:      for each pixel (x,y) in I do
10:         γ(x,y) ← argmax_θ Y [θ](x,y)    Orientation (Eq. 8)
11:         E(x,y) ← Y [γ(x,y)](x,y)        Orientation energy (Eq. 9)
12:     end for
13:     return γ,E
14: end procedure
```

To generate OVFs and orientation energy for a 3-D seismic volume, the 2D attribute enhancement techniques described above may be used to process a volume as a series of 2D slices. To use a series of 2D slices, each slice is processed in one of the ways described above and then the slices are combined to generate the 3D results. The volumetric dip and azimuth attributes may be derived from the orientation vectors in both in-line and cross-line directions. The instantaneous azimuth φ can be derived from the apparent dips in inline $γ_x$ and cross-line $γ_y$ in a variety of different ways. In one example, arctangents may be used.

$$φ = \arctan(\tan γ_x / \tan γ_y) \quad \text{(Eq. 10)}$$

and the instantaneous dip θ may be derived as $$θ = \arctan(\tan^2 γ_x + \tan^2 γ_y)^{1/2}. \quad \text{(Eq. 11)}$$

However, this approach is limited and does not directly enhance 3D features in a 3D seismic volume. A 3D fault processed using 2D methods may be shown as isolated dots instead of a continuous line. To show a line instead of dots, the 2D enhancement techniques described above may be extended to 3D by using an array of 3D log-Gabor or modified 3D log-Gabor filters.

A log-Gabor filter may be extended in a 3-D Fourier domain in spherical space-frequency coordinates. As in the 2D version, the 3D log-Gabor filter has two components, a radial component and an angular component. The angular component is then defined by two parameters: the filter's dip φ and azimuth θ as follows.

$$H^{u(\theta,\varphi)}(f,v) = \cdot \exp\left(-\frac{\ln^2(f/f_0)}{2\ln^2(\sigma_f/f_0)}\right) \times \exp\left(-\frac{\|u(\theta,\phi),v\|}{2\sigma_\alpha^2}\right) \quad \text{(Eq. 12)}$$

where f is frequency, v is a 3-D unit vector, and $f_0$ is the central frequency. The 3-D log-Gabor filter may be tuned to the direction represented by a unit vector u, whose azimuth and dip are θ and φ correspondingly. The $\|\ldots\|$ operator returns the angle between two unit vectors. The filter's central unit vector u, is a radius while the angular components are in a φ, θ plane. In a spatial domain, a 3D log-Gabor filter appears as a stack of discs and in many ways is similar to the 2-D version.

As with the 2D version, the 3D Log-Gabor filter may also be modified by replacing the radial component with a step function as follows:

$$H^{u(\theta,\varphi)}(f,v) = S(f)\exp\left(-\frac{\|u(\theta,\phi),v\|}{2\sigma_\alpha^2}\right) \quad \text{(Eq. 13)}$$

where f is frequency, v is a 3D unit vector, S(f) is a step function with 0 when f=0, and 1 for all other values of f. Like the 3-D log-Gabor filter, this filter is tuned to the direction represented by a unit vector u, whose azimuth and dip are θ and φ correspondingly. The $\|\ldots\|$ operator returns the angle between the two unit vectors.

In the 2D embodiments described above, an array of log-Gabor filters are used to simulate the orientation column responses for orientation detection, and the array is indexed by the tuned filter orientation. For 3D seismic attributes, the principles of the 2D implementation may be extended to 3D orientation detection by using a 2-D array of 3-D log-Gabor filters. The 2D array may be indexed by the azimuth θ and dip φ. In one example, θ and φ may be assigned a series of values, such as θ={−85°, −75°, −65°, −55°, . . . , 65°, 75°, 85°}, φ={−30°, −25°, −20°, −15°, . . . , 25°, 30°}. In another example, the azimuth θ={−80°, −60°, −40°, −20°, . . . , 40°, 60°, 80°} and the filter dip φ={−30°, −20°, −10°, . . . , 20°, 30°}. However, any other set of angles may be selected depending on the nature of the seismic attribute section, the faults present in the corresponding formation, and the desired detail in the results.

In one embodiment, a procedure to apply a bank of 3D filters is as follows. For an input volume V(x,y,z), first apply a 3-D Fourier transform into the 3D wave number-frequency domain $\hat{V}(u,v,w)$. The application of a 3D log-Gabor filter in the Fourier domain may be represented as follows:

$$\hat{Y}^{<\omega,\theta,\phi>}(u,v,w) = H^{<\omega,\theta,\phi>}(u,v,w)\hat{V}(u,v,w) \quad \text{(Eq. 14)}$$

where H is the 3D log-Gabor filter with azimuth θ and dip φ and central frequency w.

Using an inverse Fourier transform, $\hat{Y}^{<\omega,\theta,\phi>}(u,v,w)$ is converted into a complex volume in the spatial domain. The resulting convolved volume has a real part, $Y_r^{<\omega,\theta,\phi>}(u,v,w)$, and an imaginary part, $Y_{im}^{<\omega,\theta,\phi>}(u,v,w)$. The norm of the complex volume is the orientation energy in the specific orientations θ and φ in the frequency scale w. This can be represented as follows:

$$Y^{<\omega,\theta,\phi>}(x,y,z) = \sqrt{[Y_r^{<\omega,\theta,\phi>}(x,y,z)]^2 + [Y_{im}^{<\omega,\theta,\phi>}(x,y,z)]^2} \text{ etc.} \quad \text{(Eq. 15)}$$

As indicated by the example above, different results may be obtained depending on the various parameters that are selected. In one example, useful filter responses for $\hat{Y}^{<\omega,\theta,\phi>}$, may be obtained where w is fixed at 25 Hz, azimuth θ={−80°, −60°, −40°, −20°, . . . , 40°, 60°, 80°} and dip φ={−30°, −20°, −10°, . . . , 20°, 30°}. However, these parameters may be changed to suit different circumstances. The filter's dip is actually the fault's inclination, where 0 degree is along a vertical line, because the fault plane is perpendicular to the filter's orientation. The dip usually has 0 degrees along a horizontal line. When all the filter responses in a 2D array are lined up for an individual voxel at (x,y,z), then the orientation can be derived for that voxel. The most salient planar azimuth α and inclination β at a voxel (x,y,z) may be defined by the index of the peak value of the summed orientation responses in all scales. This may be indicated as:

$$Y^{<\omega,\theta,\phi>}(x,y,z) = <\alpha(x,y,z),\beta(x,y,z)> = \arg\max_{\theta,\phi}\Sigma_\omega Y^{<\omega,\theta,\phi>}(x,y,z) \quad \text{(Eq. 16)}$$

The orientation pair $<\alpha(x,y,z),\beta(x,y,z)>$ is one of the two components of the OVF in the output, the other is the orientation energy E(x,y,z), which is the maximum of the sum of filter responses in all scales:

$$E(x,y,z) = \Sigma_\omega Y^{<\omega,\alpha(x,y,z),\beta(x,y,z)>}(x,y,z). \quad \text{(Eq. 17)}$$

FIG. 4 is a graphical illustration of the real part of the filter responses for a volume of horizontal slices in the spatial domain determined using a 2D array of 3D modified Log-Gabor filters. In this case, the filters' azimuths are set at θ={−80°, −60°, −40°, −20°, . . . , 40°, 60°, 80°} and the filters' dips are set at φ={−30°, −20°, −10°, . . . , 20°, 30°}.

As with the 2D implementation, the 3D attribute enhancement is presented herein as three different example pseudo code listings. In the first example, Example 9, a single central frequency is used. In Example 10 multiple frequencies are used and in Example 11 a modified 3D log-Gabor filter is used with multiple frequencies. For Example 11 the frequency parameters are removed and the modified version of the log-Gabor filter is used as the orientation detectors.

Example 4 is a pseudo code example of enhancing an attribute such as coherence, symmetry or any other attribute using a single frequency log-Gabor filter similar to that of Example 1 but in the case of a 3D volume, rather than the 2D slice discussed above. In this case, the seismic attribute section is a volume and each point in the is a voxel. The point has a position and an attribute value associated with the position. Considering Example 4 more precisely, the operations can be stated in terms of a method of enhancing the fault structures from a 3-D seismic attribute volume V, to generate a volume with enhanced faults. The operations include:

(a) Obtaining a 3-D seismic attribute volume V.

(b) Assuming an array of filter azimuth orientations AZ, an array of filter dip orientations D, and an array of frequencies Ω as parameters for the filter bank, (c) Converting the V into the spatial-frequency domain $\hat{V}$ using 3D Fourier transform.

(d) For every azimuth θ in array AZ, every dip φ in D, and every frequency ω in Ω, these operations are performed:

i. Defining a corresponding 3D log-Gabor filter $\hat{H}[\theta,\phi,\omega]$ in the spatial-frequency domain;

ii. Convolving $\hat{V}$ with in the spatial-frequency domain, and saving the result into [θ,φ,ω]; and iii. Converting [θ,φ,ω] back to spatial domain R[θ,φ,ω] by inverse Fourier transform.

(e) For every azimuth θ in array AZ and every dip φ in D, summing up the energy of R[θ,φ,ω] for all frequencies ω in Ω and saving the result to Y[θ,φ].

(f) For every voxel (x,y,z) in V, these operations are performed:

i. Getting the pair [α,β] such that Y[α,β](x,y,z) has the maximum value of any other Y[θ,φ](x,y,z) (the value α is the azimuth that is associated with the input voxel at (x,y,z), while β is the inclination dip that is associated with the input voxel (x,y,z));

ii. Saving the value of Y[α,β](x,y,z) to E(x,y,z), which is the orientation energy associated with the input voxel (x,y,z).

As in the case of the 2D operations, the seismic attribute may be a coherence volume, a symmetry attribute volume or any other attribute. The frequency array may have one or many frequencies for each voxel.

Example 4

Illuminator-3D (Single Frequency)

```
1: procedure ENHANCE3DSF(V,f₀,σ_f,σ_α,AZ,D)
     V: seismic volume in 3D, f₀: an array of log-Gabor central frequencies, σ_f: log-Gabor
     frequency standard deviation, σ_α:log-Gabor angle standard deviation, AZ and
     D: array of filters' azimuth and dip angles.
2:     V̂ ← FFT 3(V)                              Apply 3D Fourier transform
3:     for each azimuth orientation θ in AZ do
4:        for each dip orientation φ in D do
5:           Ĥ[θ,φ] ← modifiedLogGabor3(f₀,σ_f,σ_α,θ,φ)  3D log-Gabor filter (Eq. 12)
6:           [θ,φ] ← Ĥ[θ,φ] · V̂                  Convolution (Eq. 14)
7:           R[θ,φ] ← IFFT 3( [θ,φ])              Apply inverse 3D Fourier transform
8:           Y [θ,φ] ← ||R[θ,φ]||                 Get the absolute value (Eq. 15)
9:        end for
10:    end for
11:    for each voxel (x,y,z) in V do
12:       [α(x,y,z),β(x,y,z)] ← argmax_(θ,φ) Y [θ,φ](x,y,z)  Orientation (Eq. 16)
13:       E(x,y,z) ← Y [α(x,y,z),β(x,y,z)](x,y)    Orientation energy (Eq. 17)
14:    end for
15:    return α,β,E
16: end procedure
```

Example 5 is a pseudo code example of enhancing an attribute such as coherence, symmetry or any other attribute using a multiple frequency modified log-Gabor filter instead of the single frequency log-Gabor filter of Example 4. Considering Example 4 more precisely, the operations can be stated in terms of a method of enhancing the fault structures from a 3-D seismic attribute volume V, to generate a volume with enhanced faults. These operations include:

(a) Obtaining a 3-D seismic attribute volume V.

(b) Given an array of azimuth orientations AZ and an array of dip orientations D as parameters for the filter bank, (c) Converting the attribute volume V into the spatial-frequency domain V̂ by a 3D Fourier transform.

(d) For every azimuth θ in the array AZ, and every dip φ in the array D, the following operations are performed:

i. Defining a corresponding 3D log-Gabor filter Ĥ[θ,φ] in the spatial-frequency domain;

ii. Convolving V̂ within the spatial-frequency domain, and saving the result into [θ,φ]; and iii. Converting [θ,φ] back to spatial domain Y[θ,φ] by inverse Fourier transform.

(e) For every voxel (x,y,z) in V, the following operations are performed:

i. Getting the pair [α,β] such that Y[α,β](x,y,z) has the maximum value of any other Y[θ,φ](x,y,z), (the value α is the azimuth that is associated with the input voxel at (x,y,z), while β is the inclination that is associated with the input voxel (x,y,z));

ii. Saving the value of Y[α,β](x,y,z) to E(x,y,z), which is the orientation energy associated with the input voxel (x,y,z).

Figure 6:
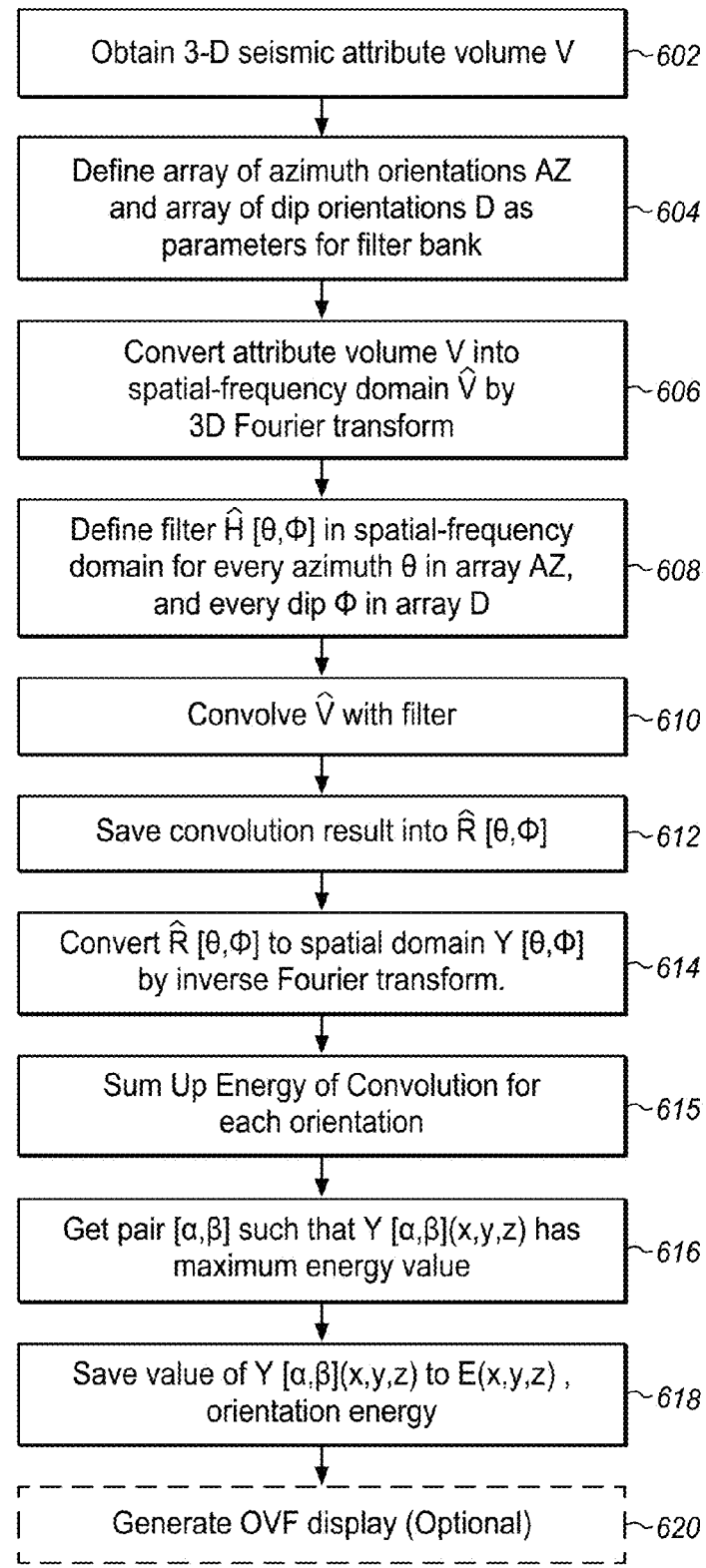
FIG. 6 is a process flow diagram of generating an orientation for a seismic attribute volume according to an embodiment of the invention.

These operations are shown in the process flow diagram of FIG. 6. At 602, a 3-D seismic attribute volume V is obtained. At 604 an array of azimuth orientations AZ and an array of dip orientations D are defined as parameters for a filter bank. The filter may be a 3D log-Gabor filter, a modified 3D log-Gabor filter or an array of 2D filters as described above. Other optical filters may alternatively be used, depending on the particular implementation.

At 606, the attribute volume V is converted into a spatial-frequency domain V̂ by a 3D Fourier transform. At 608, a filter Ĥ[θ,φ] is defined in the spatial-frequency domain for every azimuth θ in array AZ, and every dip φ in array D. At 610, V̂ is convolved with the filter for every azimuth θ, and every dip φ. At 612, the convolution results are saved. For convenience purposes these are named as [θ,φ]. However, as with all other variable, matrices and values, the invention is not limited to these particular names. At 614, [θ,φ] is converted to the spatial domain Y[θ,φ] by inverse Fourier transform.

At 615 the energy of the convolution for each orientation is summed up. At 616 a pair [α,β] is found for every voxel (x,y,z) in V such that Y[α,β](x,y,z) has a maximum energy value, then at 618, the value of Y[α,β] is saved for every voxel (x,y,z) in V to E(x,y,z), the orientation energy. At 620, an OVF display is optionally generated. Using the enhanced attributes volume as shown by the orientation energy, features in the seismic slice may more easily be found.

Example 5

ENHANCE3DMF (Multiple Frequencies)

```
1: procedure ENHANCE3DSF(V,Ω,σ_f,σ_α,AZ,D)
     V: seismic volume in 3D, Ω: an array of log-Gabor central frequencies,
     σ_f: log-Gabor frequency standard deviation, σ_α:log-Gabor angle standard
     deviation, AZ and D: array of filters' azimuth and dip angles.
2:     V̂ ← FFT 3(V)                              Apply 3D Fourier transform
3:     for each azimuth orientation θ in AZ do
4:        for each dip orientation φ in D do
```

```
5:        for each frequency ω in Ω do
6:            Ĥ[θ,φ,ω] ← logGabor3(ω,σ_f,σ_α,θ,φ)      3D log-Gabor filter
                                                         (Eq. 3.11)
7:        end for
8:        [θ,φ,ω] ← Ĥ[θ,φ,ω]V̂                         Convolution (Eq. 14)
9:        R[θ,φ,ω] ← IFFT3( [θ,φ,ω])                   Apply inverse 3D Fourier transform
10:       Y[θ,φ] ← Σ_ω ‖R[θ,φ,ω]‖                      Get the absolute value (Eq. 15)
11:     end for
12:   end for
13:   for each voxel (x,y,z) in V do
14:      [α(x,y,z),β(x,y,z)] ← argmax_(θ,φ) Y[θ,φ](x,y,z)  Orientation (Eq. 16)
15:      E(x,y,z) ← Y[α(x,y,z),β(x,y,z)](x,y)              Orientation energy (Eq. 17)
16:   end for
17:   return α,β,E
18: end procedure
```

Example 6 is a pseudo code example of enhancing an attribute such as coherence, symmetry or any other attribute using a multiple frequency modified log-Gabor filter instead of the single or multiple frequency log-Gabor filter of Examples 4 and 5. The operations are similar except for the filter that is used.

Example 6

ENHANCE3D (Modified Log-Gabor Filter)

```
1: procedure ENHANCE3MODIFIED(V,σ_α,AZ,D)    V : seismic volume in 3D, σ_α:log-
      Gabor angle standard deviation, AZ and D: array of filter azimuth and dip angles.
2:   V̂ ← FFT 3(V)                             Apply 3D Fourier transform
3:   for each azimuth orientation θ in AZ do
4:     for each dip orientation φ in D do
5:        Ĥ[θ,φ] ← modifiedLogGabor3(σ_α,θ,φ)  Modified 3D
                                                log-Gabor filter (Eq. 3.12)
6:        [θ,φ] ← Ĥ[θ,φ]V̂                     Convolution (Eq. 14)
7:        R[θ,φ] ← IFFT3( [θ,φ])              Apply inverse 3D Fourier transform
8:        Y[θ,φ] ← ‖R[θ,φ]‖                   Get the absolute value (Eq. 15)
9:     end for
10:  end for
11:  for each voxel (x,y,z) in V do
12:     [α(x,y,z),β(x,y,z)] ← argmax_(θ,φ) Y[θ,φ](x,y,z)  Orientation (Eq. 16)
13:     E(x,y,z) ← Y[α(x,y,z),β(x,y,z)](x,y)              Orientation energy (Eq. 17)
14:  end for
15:  return α,β,E
16: end procedure
```

Embodiments as described herein may be used to enhance an image of a symmetry attribute, a coherence attribute, or any of a variety of other attributes with orientation energy. The orientation energy can suppress the noise, where less orientation patterns occur, and to enhance meaningful curve patterns where the orientation energy is salient and strong. In such cases, the fault features as well as the boundary of other unique features in the formation will have stronger orientation patterns and these are kept and enhanced in the enhanced image. On the other hand, isolated spots and uniform areas are suppressed due to a lack of orientation patterns. The orientation energy gives a more clean and smooth indication of the discontinuous features.

The orientation energy may also connect the lines that are broken in an attribute image. This allows faults on amplitude data to be highlighted. Embodiments may also be applied to fault attributes in volumes that are processed with a Sobel filter on e.g. horizontal slices. While the original Sobel attribute may show discontinuous patterns, the orientation energy may be used to show sharp and clear fault lines in both vertical and horizontal slices. The sharp and clear fault lines are all the more clear due to the removal of other noise.

Some seismic attributes reveal many other discontinuities such as channels. These other discontinuities make it more difficult to pick out the faults. Using the orientation energy as described above allows planar features such as faults to be preserved while other 3D edge patterns, such as channels, are suppressed. Horizontal noise is also suppressed.

Figure 7:
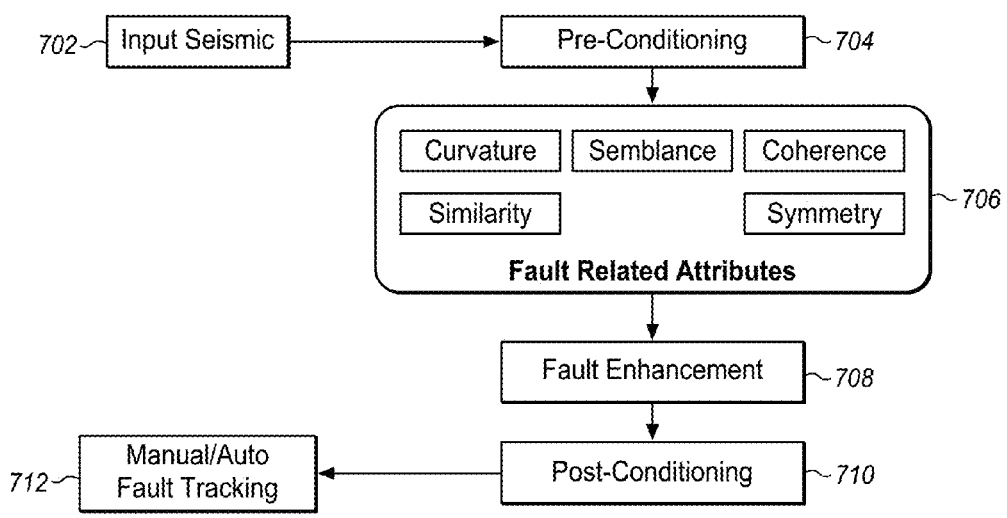
FIG. 7 is a diagram of fault tracking workflow according to an embodiment of the invention.

The enhanced attributes described herein may be used as an aid to characterize a formation. The attribute enhancement and the orientation vector fields may be applied to many different purposes and may be combined with many other techniques. One use is to find or pick polylines or faults from input seismic data. FIG. 7 shows an example process flow for fault tracking which may be done manually or automatically. In this case, a variety of different seismic trace attributes may be combined and used together.

In the example workflow of FIG. 7, input seismic data is received 702. The input seismic data is usually amplitude data in a 3D volume. This seismic data may then be pre-conditioned 704. Pre-conditioning includes noise reduction which can be conducted, for example, through a median filter or a band-pass filter. The pre-conditioning, or alternatively, noise reduction is an initial operation to clean the input data. This may be done with a simple median filter. For 3D seismic data, a 3D median filter may be employed. A median filter may in many instances significantly improve the quality of the fault attribute.

Some fault or fracture features may only be clearly seen within a certain bandwidth. In such a case, a band-pass filter is an alternative to a median filter for pre-conditioning the seismic data. Different bandwidths illustrate different fault or fracture patterns. A spectrum decomposition may in such a case be used as a pre-conditioning step.

The smoothed amplitude data may then be used to generate fault related attributes 706, such as semblance, coherence, similarity, among others, or symmetry as described above. There are a variety of different attributes that may be determined in different ways.

The fault attribute may then be exposed to an enhancement operation 708. The fault enhancement may be used to take a fault attribute as input, such as coherence or symmetry and then highlight it or enhance it so that a fault or other characteristic of the formation may be more easily detected and discovered. As an example, the enhanced fault attributes may have smoother and cleaner curves, lines, or planes and sharper contrast. A further post-conditioning operation 710 may be applied to the fault enhanced volume to suppress unwanted features.

The enhanced faults or faults without enhancement may be applied to a process that picks out the faults 712 either manually or automatically so that the faults may be identified. A geologist may analyze imagery to find faults or a fault tracking algorithm may be used to select possible faults for review or analysis. As an alternative to picking faults, the symmetry attribute may be used for fracture tracking, for detecting channels beside faults and fractures, for finding non-conformities, and for data enhancement operations. Picking the faults may depend upon the developed fault attributes to show the fault patterns.

Figure 8:
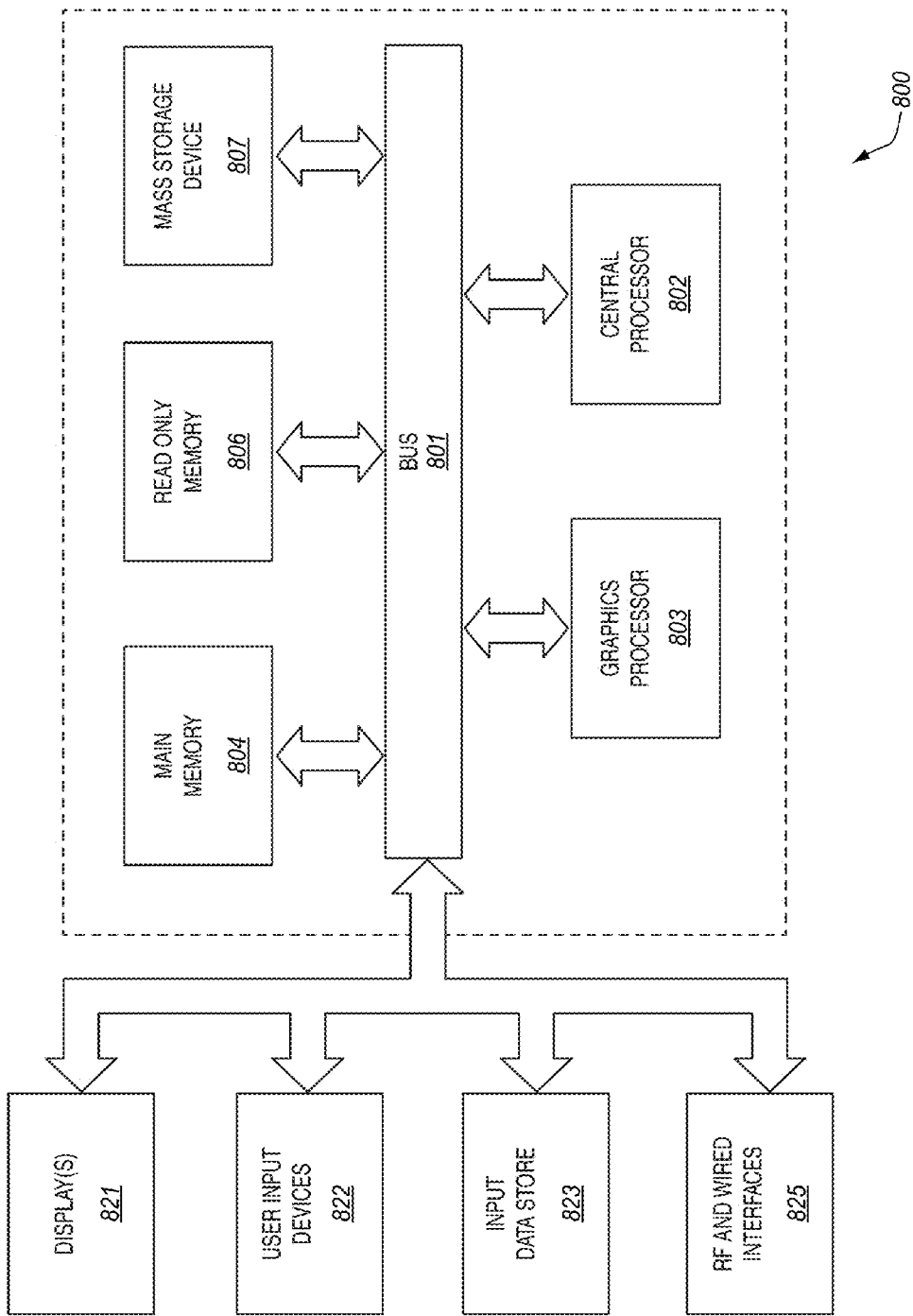
FIG. 8 is an example computing system suitable for implementing embodiments of the present invention.

FIG. 8 is a block diagram of a computing system suitable for use in evaluating input seismic data, finding attributes, enhancing attributes, and picking faults, polylines and more as described above, such as a personal computer, workstation computer, minicomputer, main frame computer, server, etc.

The device computer system 800 includes a bus or other communication means 801 for communicating information, and a processing means such as one or more microprocessors 802 coupled with the bus 801 for processing information. The computer system may be augmented with a graphics processor 803 specifically for rendering graphics through parallel pipelines. These processors may be incorporated into the central processor 802 or provided as one or more separate processors.

The computer system 800 further includes a main memory 804, such as a random access memory (RAM) or other dynamic data storage device, coupled to the bus 801 for storing information and instructions to be executed by the processor 802. The main memory also may be used for storing temporary variables or other intermediate information during execution of instructions by the processor. The computer system may also include a nonvolatile memory 806, such as a read only memory (ROM) or other static data storage device coupled to the bus for storing static information and instructions for the processor.

A mass memory 807 such as a magnetic disk, optical disc, or solid state array and its corresponding drive may also be coupled to the bus of the computer system for storing information and instructions. The computer system can also be coupled via the bus to a display device or monitor 821, such as a Liquid Crystal Display (LCD) or Organic Light Emitting Diode (OLED) array, for displaying information to a user. For example, graphical and textual indications of installation status, operations status and other information may be presented to the user on the display device, in addition to the various views and user interactions discussed above.

Typically, user input devices, such as a keyboard with alphanumeric, function and other keys, may be coupled to the bus for communicating information and command selections to the processor. Additional user input devices may include a cursor control input device such as a mouse, a trackball, a trackpad, or cursor direction keys can be coupled to the bus for communicating direction information and command selections to the processor and to control cursor movement on the display 821.

Input data stores 823 are coupled to the bus to provide input seismic data or intermediate values from other computer systems as mentioned above.

Communications interfaces 825 are also coupled to the bus 801. The communication interfaces may include a modem, a network interface card, or other well known interface devices, such as those used for coupling to Ethernet, token ring, or other types of physical wired or wireless attachments for purposes of providing a communication link to support a local or wide area network (LAN or WAN), for example. In this manner, the computer system may also be coupled to a number of peripheral devices, other clients, control surfaces or consoles, or servers via a conventional network infrastructure, including an Intranet or the Internet, for example.

A lesser or more equipped system than the example described above may be preferred for certain implementations. Therefore, the configuration of the example system 800 will vary from implementation to implementation depending upon numerous factors, such as price constraints, performance requirements, technological improvements, or other circumstances.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method for enhancing three dimensional fault attributes within a set of three dimensional seismic data, the method comprising:
   converting the set of three dimensional seismic data from a spatial domain to a spatial-frequency domain using a Fourier transform, the set of three dimensional seismic data including an array of points identifying the three dimensional fault attributes;
   convolving the set of three dimensional seismic data with a plurality of three dimensional orientation filters in the spatial-frequency domain, the plurality of three dimensional filters forming an orientation filter array;
   converting the convolution result back to the three dimensional spatial domain by inverse Fourier transform;
   calculating an energy for each orientation filter using the converted convolution result;
   identifying an orientation filter of the orientation filter array having a response with a maximum energy for each point in the seismic data;
   associating an orientation of the orientation filter having the maximum energy with the corresponding energy and the corresponding point for each point in the seismic data; and
   enhancing a continuity of the three-dimensional fault attributes in the seismic data using the orientations associated with points in the seismic data.

2. The method of claim 1, wherein convolving comprises convolving for every orientation in the orientation filter array.

3. The method of claim 2, wherein convolving comprises convolving for every frequency in a frequency array.

4. The method of claim 1, wherein calculating the energy comprises taking an absolute value of a complex number representing a converted convolution result for each orientation.

5. The method of claim 4, wherein calculating the energy comprises summing an absolute value converted convolution result for each frequency.

6. The method of claim 1, wherein the orientation is defined by an azimuth and a dip.

7. The method of claim 6, wherein associating the orientation and energy comprises finding an azimuth, dip pair with the maximum energy value for each point in the three dimensional seismic data.

8. The method of claim 1, wherein the three dimensional orientation filters include three dimensional log-Gabor filters.

9. The method of claim 8, wherein the three dimensional log-Gabor filters are modified by a binary step function that replaces a radial component of the three dimensional log-Gabor filters.

10. The method of claim 1, wherein the three dimensional fault attributes are discontinuous fault attributes and wherein enhancing a continuity of the three-dimensional fault attributes in the seismic data includes connecting the fault attributes using the orientations associated with points in the seismic data.

11. A tangible, non-transitory machine-readable medium having instructions thereon that, when operated on by the machine, cause the machine to perform operations comprising:
    accessing a set of seismic data that includes data points identifying fault attributes;
    converting the set of seismic data from a spatial domain to a spatial-frequency domain using a Fourier transform;
    for each filter in an orientation filter array, convolving the set of seismic data with a filter in the spatial-frequency domain;
    converting the convolution result back to the spatial domain by inverse Fourier transform;
    calculating an energy for each orientation using the converted convolution result;
    finding an orientation filter of the orientation filter array having a response with a maximum energy for a plurality of points in the seismic data;
    associating an orientation of the filter having the maximum energy with the corresponding energy and the corresponding point for the plurality of points in the seismic data; and
    enhancing the fault attributes in the seismic data by reducing data patterns perpendicular to the fault attributes using the association of the orientation of the filter with the corresponding energy and the corresponding point for the plurality of points in the seismic data.

12. The tangible, non-transitory machine-readable medium of claim 11, wherein convolving comprises convolving for every orientation in the orientation filter array, and wherein calculating the energy comprises taking an absolute value of a complex number representing a converted convolution result for each orientation.

13. The tangible, non-transitory machine-readable medium of claim 12, wherein convolving comprises convolving for every frequency in a frequency array and wherein calculating the energy comprises summing the absolute value converted convolution result for each frequency.

14. An apparatus comprising:
    one or more processors;
    a data store to provide seismic input data to the one or more processors, the seismic input data having a plurality of seismic traces corresponding to a formation and fault attribute sections formed of an array of points, each having a position and an attribute value associated with each point;
    a fault attribute enhancement module configured to use the one or more processors to:
        convert the seismic input data from a spatial domain to a three dimensional spatial-frequency domain using a three dimensional Fourier transform,
        for each filter in an orientation filter array, convolve the seismic input data with a three dimensional filter in the spatial-frequency domain;

convert the convolution result back to the spatial domain by inverse Fourier transform;

calculate an energy for each orientation using the converted convolution result;

for each point in the seismic input data, identify an orientation filter of the orientation filter array having a response with a maximum energy; and for each point in the seismic input data, associate the orientation of the filter having the maximum energy with the corresponding energy and the corresponding point; and a fault enhancer configured to use the one or more processors to emphasize patterns in the seismic input data that are parallel and adjacent to at least one of the fault attribute sections using the associated orientations, points, and energies.

15. The apparatus of claim 14, wherein the orientation is defined by an azimuth and a dip.

16. The apparatus of claim 15, wherein associating the orientation and energy comprises finding an azimuth, dip pair with the maximum energy value for each point in the seismic input data.

17. The method of claim 1, wherein enhancing the continuity of the three-dimensional fault attributes in the seismic data includes reducing data patterns perpendicular to the fault attributes.

18. The method of claim 1, wherein enhancing the continuity of the three-dimensional fault attributes in the seismic data includes connecting the fault attributes to identify a three dimensional planar fault.

* * * * *